Figure 1:
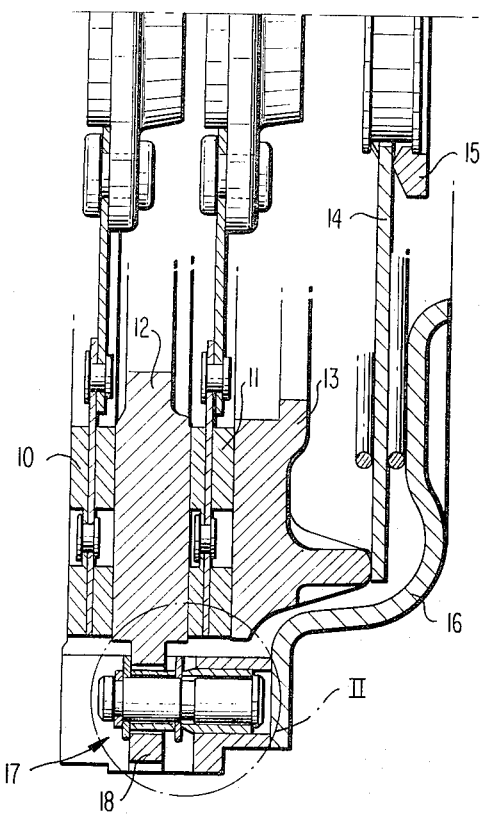

United States Patent [19]
Wörner et al.

[11] 3,797,622
[45] Mar. 19, 1974

[54] ADJUSTING MECHANISM FOR THE INTERMEDIATE PLATE IN TWO DISC CLUTCHES

[75] Inventors: Günter Wörner, Rommelshausen; Peter Schrape, Stuttgart, both of Germany

[73] Assignee: Daimler-Benz Aktiengesellschaft, Stuttgart-Unterturkheim, Germany

[22] Filed: Dec. 17, 1971

[21] Appl. No.: 209,311

[30] Foreign Application Priority Data
Dec. 19, 1970 Germany............................ 2062764

[52] U.S. Cl. .............................. 192/111 A, 188/71.8
[51] Int. Cl. ............................................ F16d 13/75
[58] Field of Search.......... 192/111 A, 70.25, 70.28; 188/71.8, 196 P

[56] References Cited
UNITED STATES PATENTS

| | | | |
|---|---|---|---|
| 2,354,829 | 8/1944 | Reed............................ | 192/70.28 X |
| 2,551,252 | 5/1951 | Bois............................. | 188/196 P X |
| 2,900,052 | 8/1959 | Frayer et al................. | 188/196 P X |
| 3,085,663 | 4/1963 | Jakeways...................... | 188/71.8 X |
| 3,113,646 | 12/1963 | Airheart et al. .............. | 188/71.8 X |

FOREIGN PATENTS OR APPLICATIONS
966,888    8/1964    Great Britain................. 192/111 A

*Primary Examiner*—Benjamin W. Wyche
*Attorney, Agent, or Firm*—Craig and Antonelli

[57] ABSTRACT

A readjusting mechanism for the intermediate plate in two-disk clutches intended in particular for motor vehicles, in which the intermediate plate is connected with the driving clutch part by way of spring bands or the like so as to be non-rotatable with respect thereto but axially displaceable against spring action; means are also provided for the readjustment of the intermediate plate corresponding to the wear at the clutch disks which include bolts distributed uniformly over the circumference and extending parallel to the axis which are retained force-lockingly in the driving clutch part and extend through corresponding bores in the intermediate plate; the bolts guide the intermediate plate axially between two abutments with a play which at least approximates the vent play of the clutch, whereby the force-locking engagement can be overcome by the actuating force of the clutch but not by the return spring system of the intermediate plate.

19 Claims, 2 Drawing Figures

PATENTED MAR 19 1974  3,797,622

ADJUSTING MECHANISM FOR THE INTERMEDIATE PLATE IN TWO DISC CLUTCHES

The present invention relates to an adjusting mechanism for the intermediate plate in two-disk clutches intended especially for motor vehicles, whereby the intermediate plate is connected non-rotatably but axially displaceably against spring action with the driving clutch part by way of spring bands or the like and whereby means for the readjustment of the intermediate plate corresponding to the wear at the clutch disks are provided.

With two-disk clutches of the aforementioned type, there arises the problem of the readjustment of the intermediate plate. The springy suspension of the intermediate plate produces an axial spring effect whereby the intermediate plate is constantly brought back into its constructively predetermined position. Since the clutch actuating path or travel is constant, there exists the danger especially with wear of the clutch disk facing the engine that the intermediate plate adheres or sticks, so to speak of, at the clutch disk facing the transmission due to the aforementioned axial spring action, i.e., therefore no longer disengages from the same. As a result thereof, the clutch cannot be properly disengaged, i.e., it transmits a residual moment which is not inconsiderable so that a synchronization in the following transmission is made more difficult or even made practically impossible.

The present invention is concerned with the task to provide an effective solution to this problem. The present invention solves the underlying problems with the aforementioned clutches in that bolts uniformly distributed over the circumference and disposed parallel to the axis are force-lockingly retained in the driving clutch part, which extend through corresponding bores provided in the intermediate plate and which guide this intermediate plate with play axially between two abutments, which play at least approximates the vent play of the clutch and in the force-locking engagement is adapted to be overcome by the actuating force of the clutch but not by the return spring system of the intermediate plate.

The present invention offers the advantage that now the intermediate plate is adjusted at all times corresponding to the wear, especially to the wear of the clutch disk facing the engine, to a new normal position, and during the disengagement of the clutch returns only to this normal position, i.e., therefore not to the starting position conditioned by its springy suspension. In this manner, both clutch disks can during the unclutching disengage from the intermediate plate corresponding to the predetermined vent play, i.e., a completely satisfactory disengagement of the clutch is possible without residual moment. The synchronization in the following transmission can therefore take place without difficulties.

The readjusting mechanism provided according to the present invention is preferably provided three times and is thereby appropriately arranged between the tangential spring bands for the intermediate plate. It is thereby additionally provided that each bolt extends through the corresponding bore of the intermediate plate with relatively large play and an abutment ring is mounted and secured on the bolt on both sides of the intermediate plate. It is achieved in this manner that during the yielding of the tangential spring bands in the circumferential direction, no abutment of the intermediate plate at the bolt and consequently also no canting thereof occurs.

It is additionally proposed according to the present invention that each bolt is force-lockingly retained in its bore within the driving housing by a clamping spring, a spring cotter or the like.

The further advantage results from the present invention that the bolts in the driving housing can be guided over a sufficient length. This is possible more readily thereat than it would be feasible in the intermediate plate limited in its width. Additionally, the bolts do not abut approximately with their end opposite the guide means at a rotating clutch part so that they cannot cant.

A further feature of the present invention resides in that a clamping sleeve is arranged on the bolt between two axial abutments--one of which may form simultaneously the abutment for the intermediate plate--which abuts force-lockingly at the inner circumference of the bore in the driving clutch part as well as at the bolts.

In connection therewith, it is then further proposed that the two abutments for the intermediate plate are fixed by a spacer sleeve disposed therebetween.

A further proposal of the present invention is to the effect that the intermediate plate is provided at the outer circumference with eyes which are provided with the bores for receiving the bolts and which are axially considerably narrower than the intermediate plate itself. A space-saving arrangement can be achieved in this manner.

Accordingly, it is an object of the present invention to provide a readjusting mechanism for the intermediate plate of two-disk clutches which avoids the aforementioned shortcomings and drawbacks encountered in the prior art.

Another object of the present invention resides in a readjusting mechanism for the intermediate plate in two-disk clutches which assures the complete disengagement of the clutch under all conditions and thus prevents the transmission of a residual torque.

A further object of the present invention resides in a readjusting mechanism for two-disk clutches which assures a completely satisfactory sychronization in the following transmission.

Still another object of the present invention resides in a clutch of the aforementioned type which enables a completely satisfactory clutch disengagement at all times.

Another object of the present invention resides in a two-disk clutch, especially for motor vehicles, in which a canting of the intermediate plate is effectively prevented.

A further object of the present invention resides in a readjusting mechanism for the intermediate plate in two disk clutches which permits a space-saving arrangement.

Figure 2:
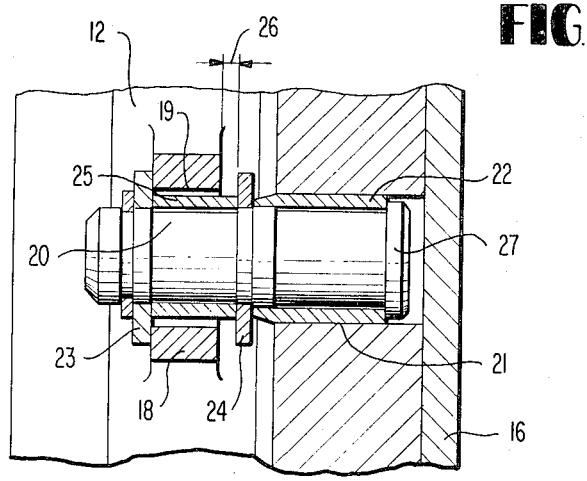

These and further objects, features, and advantages of the present invention will become more apparent from the following description when taken in connection with the accompanying drawing which shows, for purposes of illustration only, one embodiment in accordance with the present invention, and wherein:

FIG. 1 is a partial longitudinal cross-sectional view through a two-disk clutch with a readjusting mechanism in accordance with the present invention; and FIG. 2 is a partial cross-sectional view, on an enlarged scale, illustrating the details encircled in dash and dot lines in FIG. 1 and designated by II.

Referring now to the drawing wherein like reference numerals are used throughout the two views to designate like parts, according to FIG. 1, the two clutch-disks 10 and 11 of a two-disk clutch are arranged in a conventional manner on the driven shaft (not shown). An intermediate plate 12 is disposed between the two clutch-disks 10 and 11 which is retained in the driving clutch part in a conventional manner by means of approximately tengentially extending spring bands such as flat keep springs. Since the details of the connection of the clutch disks 10 and 11 and of the intermediate plate 12 are known as such and form no part of the present invention, a detailed description and showing thereof is dispensed with herein. The pressure plate 13 of the clutch is stressed by a cup spring 14 and is disengaged by an actuating member 15 not illustrated in further detail. The cup spring 14 is supported in the driving clutch part 16.

A readjusting mechanism generally designated by reference numeral 17 is disposed between the aforementioned spring bands. For that purpose, the intermediate plate 12 is provided with eyes 18. According to FIG. 2, bores 19 are provided in the eyes 18 through which extend bolts 20 which, in their turn, are force-lockingly retained in a bore 21 of the driving clutch part 16 by a spring cotter or spring sleeve 22. The bore 19 in the eyes 18 of the intermediate plate 12 has a relatively large play with respect to the bolt 20.

The spring cotter or sleeve 22 is so matched that the force-locking engagement in the bore 21 can be overcome only by the actuating force of the clutch but not by the return spring system of the tangential suspension of the intermediate plate 12.

Abutment disks 23 and 24 are arranged on the bolt 20 on both sides of the eye 18 which are retained at a predetermined distance by a spacer sleeve 25 disposed therebetween. The abutment disks 23 and 24 possess a certain play 27 with respect to the eye 18 which corresponds to the vent play of the clutch. The spring cotter or sleeve 22 is disposed force-lockingly between the abutment disk 24 and a collar 27 at the end of the bolt 20.

OPERATION

The operation of the mechanism according to the present invention is as follows:

During the engagement of the clutch, the intermediate plate 12 takes along by means of its eyes 18 and by way of the abutment disk 23 the bolt 20 against the force-locking engagement in the bore 21 up to the position corresponding to the wear. During the disengagement of the clutch from this position, the intermediate plate 12 goes back only by a distance corresponding to the play 26—which corresponds to the predetermined vent play—and then abuts at the disk 24. The intermediate plate 12 stops in this position whereby the residual axial force stemming from its elastic suspension—which as such would attempt to bring the intermediate plate still further back—is absorbed by the force-locking engagement in the bore 21. The bolt 20 will therefore come out of the bore 21 to an ever-greater extent corresponding to the wear. It can never be pushed back into its starting position again by the return spring system of the intermediate plate 12 since this return spring system cannot overcome the force-locking engagement in the bore 21.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. A clutch adjusting mechanism having a driving clutch part, a pair of disk clutches, an intermediate plate disposed between said clutch disks operatively connected with said driving clutch part and being non-rotatable with respect thereto but axially displaceable therefrom. and means for automatically readjusting said intermediate plate corresponding to the wear of said clutch disks including a plurality of bolt means substantially uniformly distributed over the circumference of said driving clutch part for axially guiding said intermediate plate, a plurality of bores provided in said clutch part for force-locking retaining said bolts therein, each of said bolts extends through a corresponding bore provided in said intermediate plate, each of said bores being dimensioned to permit relatively large play between said bolts and said intermediate plate, a pair of abutment means disposed on each of said bolts for limiting the displacement of said intermediate plate spaced at a distance which at least approximates the play in the clutch between engagement and disengagement thereof, at least one of said pair of abutment means includes an abutment disk mounted and secured on each of said bolts, the other of said abutment means includes an abutment disk secured on each of said bolts, each of said abutment means being disposed on a respective side of said intermediate plate, means for force-lockingly retaining each of said bolts in its corresponding bore in said driving clutch part, a clamping sleeve arranged on each of said bolts between one of said abutment means and said driving clutch part, said clamping sleeve force-lockingly abutting the inner circumference of a respective bore in said driving clutch part, a spacer means disposed between said abutment means for maintaining a fixed distance therebetween, a clutch adjusting mechanism according to claim 23, said spacer means includes a spacer sleeve disposed between said abutment means whereby said force locking retention of said bolt means is overcome only by the actuating force of the clutch thereby readjusting said intermediate plate to correspond to the wear of said clutch disks.

2. A clutch adjusting mechanism having a driving clutch part, a pair of disk clutches, an intermediate plate disposed between said clutch disks operatively connected with said driving clutch part and being non-rotatable with respect thereto but axially displaceable therefrom, and means for automatically readjusting said intermediate plate corresponding to the wear of said clutch disks including a plurality of bolt means substantially uniformly distributed over the circumference of said driving clutch part for axially guiding said intermediate plate, a plurality of bores provided in said clutch part for force-lockingly retaining said bolts therein, a pair of abutment means for limiting the displacement of said intermediate plate spaced at a distance which at least approximates the play in the clutch between engagement and disengagement thereof, said abutment means being fixed by a spacer sleeve disposed therebetween, whereby said force-locking retention of said bolt means is overcome only by the actuating force of the clutch thereby readjusting said intermediate plate to correspond to the wear of said clutch disks.

3. A clutch adjusting mechanism according to claim 2, wherein said intermediate plate is provided at the outer circumference thereof with eyes which receive the bores for said bolts, said eye being axially considerably narrower than said intermediate plate itself.

4. A clutch adjusting mechanism according to claim 2, wherein each of said bolts extends through a corresponding bore provided in said intermediate plate, each of said bores being dimensioned to permit relatively large play between said bolts and said intermediate plate and at least one of said pair of abutment means includes an abutment disk mounted and secured on each of said bolts.

5. A clutch adjusting mechanism according to claim 2, wherein the other of said abutment means includes an abutment disk secured on each of said bolts, each of said abutment means being disposed on a respective side of said intermediate plate.

6. A clutch adjusting mechanism according to claim 5, further comprising means for force-lockingly retaining each of said bolts in its corresponding bore in said driving clutch part.

7. A clutch adjusting mechanism according to claim 6, wherein said last-mentioned means is a clamping spring.

8. A clutch adjusting mechanism according to claim 6, wherein said last-mentioned means is a spring sleeve.

9. A clutch adjusting mechanism according to claim 2, wherein a clamping sleeve is arranged on each of said bolts between one of said abutment means and said driving clutch part, said clamping sleeve force-lockingly abutting the inner circumference of a respective bore in said driving clutch part.

10. A clutch adjusting mechanism according to claim 9, wherein said clamping sleeve also abuts at least a portion of the bolt itself.

11. A clutch adjusting mechanism according to claim 10, wherein each of said bolts is provided with a first collar portion on the end thereof disposed in said driving clutch part, the end of said clamping sleeve opposite said abutment means engages said collar portion.

12. A clutch adjusting mechanism according to claim 9, further including spacer means disposed between said abutment means for maintaining a fixed distance therebetween.

13. A clutch adjusting mechanism according to claim 1, wherein said intermediate plate is provided at the outer circumference thereof with eyes which receive the bores for said bolts, said eyes being axially considerably narrower than said intermediate plate itself.

14. A clutch adjusting mechanism according to claim 13, wherein said clutch is a motor vehicle clutch and spring band means are provided for connecting said intermediate plate with said driving clutch part.

15. A clutch adjusting mechanism according to claim 2, further comprising means for force-lockingly retaining each of said bolts in its corresponding bore within said driving clutch part.

16. A clutch adjusting mechanism according to claim 15, wherein said last-mentioned means is a clamping spring.

17. A clutch adjusting mechanism according to claim 15, wherein said last-mentioned means is a spring cotter.

18. A clutch adjusting mechanism according to claim 2, wherein a clamping sleeve is arranged on each of said bolts between one of said abutment means and said driving clutch part, said clamping sleeve force-lockingly abutting the inner circumference of a respective bore in said driving clutch part.

19. A clutch adjusting mechanism according to claim 18, wherein said clamping sleeve also abuts at least a portion of the bolt itself.

* * * * *